United States Patent
Medwig et al.

[11] 3,759,100
[45] Sept. 18, 1973

[54] FLOWMETER

[75] Inventors: William J. Medwig, Pittsburgh; Ronald N. Koch, Allison Park, both of Pa.

[73] Assignee: Rockwell Manufacturing Company, Pittsburgh, Pa.

[22] Filed: July 15, 1971

[21] Appl. No.: 162,949

[52] U.S. Cl. .................................. 73/230
[51] Int. Cl. ............................... G01f 1/08
[58] Field of Search .............. 73/231 R, 229, 230

[56] References Cited
UNITED STATES PATENTS
3,518,880  7/1970  Kullmann et al. ............ 73/231 R
1,709,100  4/1929  Tice ........................... 73/189

Primary Examiner—Jerry W. Myracle
Attorney—William A. Strauch et al.

[57] ABSTRACT

An in-line magnetic drive flowmeter comprising a meter and housing, an impeller insertable through the wall of a pipeline, and a saddle assembly to mount the meter in the pipeline. The meter is particularly characterized by calibration means involving rotation of a housing about the impeller only, the housing having a unique tapered slot calibration opening and a stacked set of rotor elements comprising the meter impeller.

15 Claims, 14 Drawing Figures

Patented Sept. 18, 1973 3,759,100

INVENTORS
WILLIAM J. MEDWIG
RONALD N. KOCH

BY *Strauch, Nolan, Neale, Nies & Kurz* ATTORNEYS

INVENTORS
WILLIAM J. MEDWIG
RONALD N. KOCH

BY Strauch, Nolan, Neale,
Nies & Kurz ATTORNEYS

Patented Sept. 18, 1973     3,759,100

INVENTORS
WILLIAM J. MEDWIG
RONALD N. KOCH

BY Strauch, Nolan, Neale,
Nies & Kurz    ATTORNEYS

INVENTORS
WILLIAM J. MEDWIG
RONALD N. KOCH

BY Strauch, Nolan, Neale,
Nies & Kurz  ATTORNEYS

INVENTORS
WILLIAM J. MEDWIG
RONALD N. KOCH

FLOWMETER

BACKGROUND OF THE INVENTION

1. Field of the Invention

The invention is a flowmeter of the in-line inserted variety adapted to be easily mounted in conduits to measure the water flow in water distribution systems such as irrigation pipe-lines.

2. Description of the Prior Art

Inexpensive pipeline meters for measuring conduit flow have been proposed in the past for field installation, but several problems remain which detract from the desired utility of such flowmeters. First, factory pre-set calibration of prior art meters continues to prove inaccurate, thus requiring adjustment in the field. Secondly, such meters tend to leak in the vicinity of the meter calibration means. Thirdly, due to the high sensitivity of the impeller and housing of such meters, imprecise installation after calibration leaves an inaccurate meter.

SUMMARY OF THE INVENTION

It is a primary object of this invention to provide flowmeter of the type described which provides virtually leakproof calibration means and an impeller and housing which are relatively insensitive to slight alignment changes so as to retain preset calibration of the meter within desired parameters.

It is another object of the invention to provide a flowmeter having an impeller housing with a unique tapered slot in the upstream side thereof to facilitate calibration of the meter yet retain preset calibration within desired parameters although alignment of the meter when positioned in a pipeline may be slightly askew.

Still another object of the invention is to provide a flowmeter having an impeller assembly comprising stacked rotor elements assuring instant rotational response to flow within the pipeline.

Another object of the invention is to provide a flowmeter as hereinbefore described having a simplified magnetic coupling for the meter register thereof.

A further object of the invention is to provide a flowmeter which is adaptable to pipelines of varying diameters without need of changing the structural characteristics thereof.

A still further object of the invention is to provide a pipeline flowmeter having an elongate impeller assembly intersecting a substantial portion of a radius drawn through the pipeline thereby increasing the sensitivity of the instrument to flow in the pipeline.

Yet another object of the invention is to provide a flowmeter having a unique tapered slot housing combined with a stacked rotor impeller to impart insensitivity to the instrument to minor alignment changes upon installation of the meter into a pipeline so that desired accuracy is retained.

Further novel features and other objects of this invention will become apparent from the following detailed description, discussion and the appended claims taken in conjunction with the accompanying drawings.

DESCRIPTION OF THE PREFERRED EMBODIMENT

Figure 1:
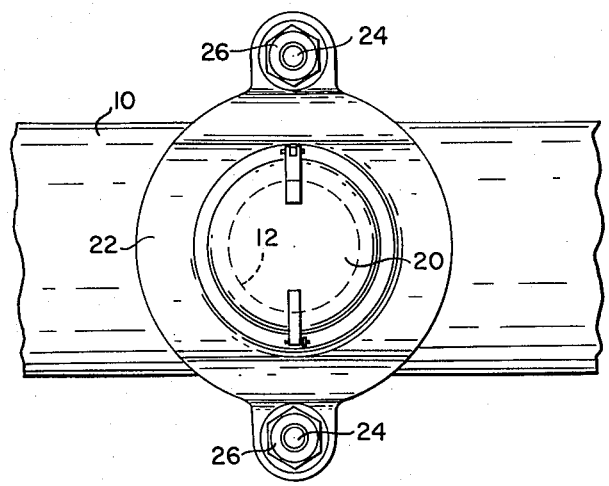
FIG. 1 is a top plan view of the flowmeter installed in a pipeline.

A pipeline 10 has an opening 12 therein into which is inserted the impeller 14 and impeller housing 16 of a flowmeter 18 provided with a readable register and protective cover 20 thereover. Flowmeter 18 further includes a pipeline encircling clamp assembly 22 to firmly position the flowmeter when installed. Clamp 22 includes at least one U-bolt 24, with threaded distal ends to receive locking nuts 26,26. A ring seal 28 (FIGS. 2 and 3) assures a watertight fit of flowmeter 18 over pipeline opening 12.

Impeller housing 16 provides calibration means and support for impeller 14 which is mounted therein on a ball shaft 30 firmly bolted at 32 to circular base plate 34 of housing 16. Impeller 14 is freely rotatably mounted on ball shaft 30 by means of a cylindrical retainer support 36 having a pair of sleeve bearings 38,38 therein and a rotor cap 40 pinned to impeller 14 at 42 having a downwardly directed bearing support insert 44 riding on ball 46 of ball shaft 30. A through passage 41 in cap 40 vents the bearing space to avoid pressure build-ups. Atop rotor cap 40 is a primary drive magnet 48 serving as one-half of a magnetic coupling for the flowmeter, the other half 50 located immediately thereabove and in close juxtaposition thereto to assure a reliable coupling. A cup-shaped pressure plate seal member 52 is bolted to flowmeter register housing 54 and 56, serves as the primary water tight seal between the register and impeller assemblies of the flowmeter, and may include additional sealing means such as O-ring 58. Pressure plate seal 52 is preferably made of non-ferromagnetic material so as not to interfere with the operation of halves 48 and 50 of the magnetic drive coupling.

The arcuate saddle 21 of the clamp assembly is integral with the register housing 54. The impeller housing 16 is mounted only on this integral structure in its predetermined adjusted position relative to the flow direction, and the foregoing mounting minimizes the changes of an accidental or undesirable change in the adjusted position of the shroud in the assembly. Only one arcuate clamp bolt 24 is shown, but it will be appreciated that if necessary two parallel side by side U- bolt assemblies may clamp the saddle to the pipeline for increased stability.

Figure 2:
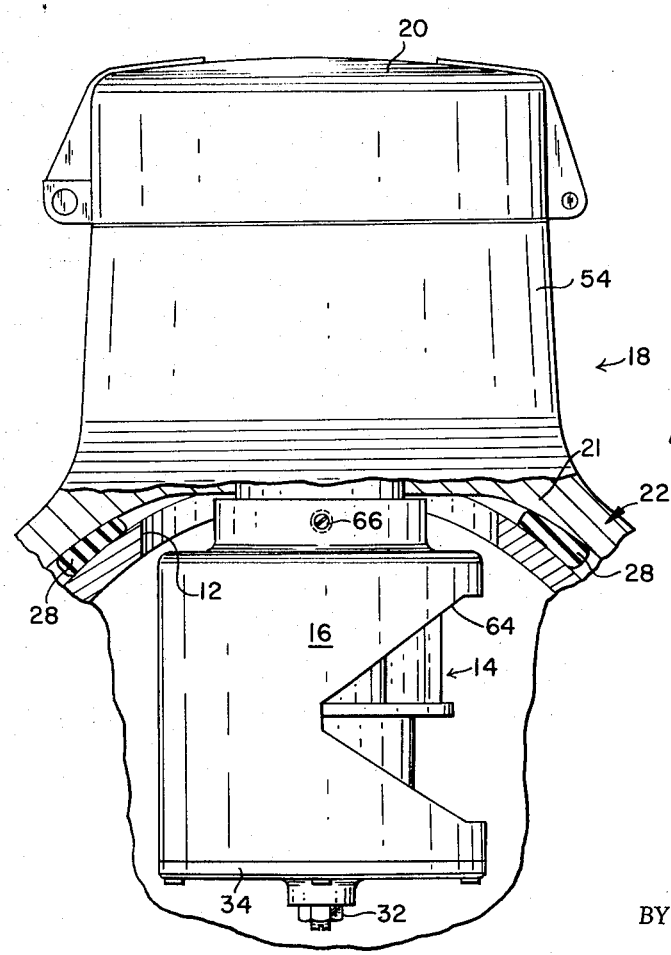
FIG. 2 is an enlarged partial internal view of the flowmeter installed in a pipeline, showing the impeller and housing.
Figure 3:
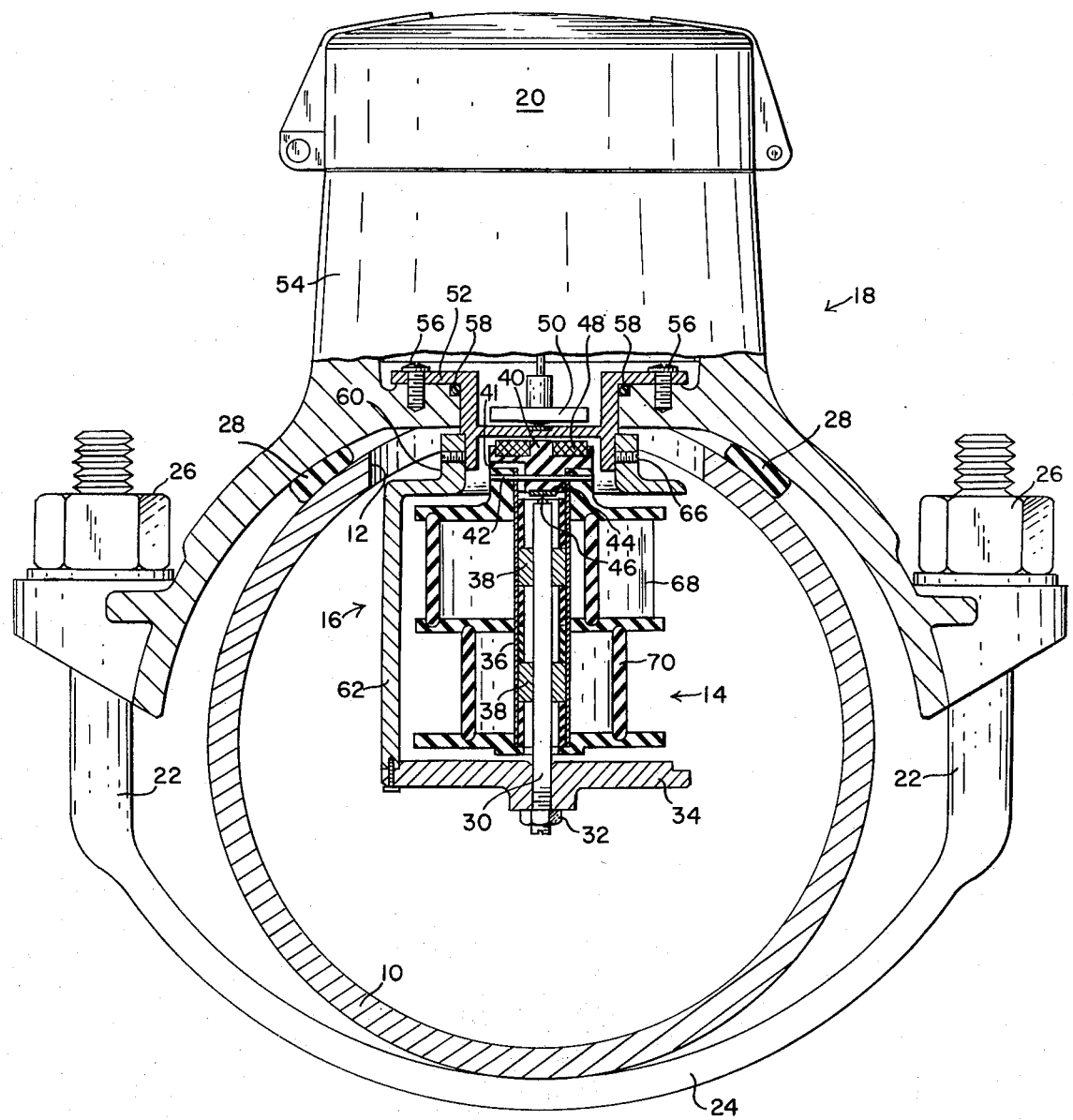
FIG. 3 is a further enlarged cross-sectional view of the installed flowmeter.
Figure 8:
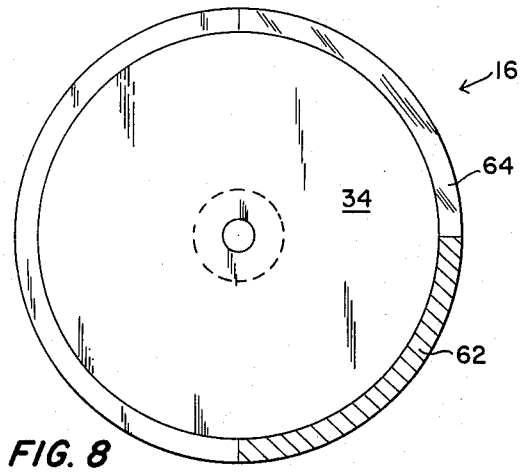
FIG. 8 is a sectional view taken along lines 8—8 of FIG. 6.
Figure 5:
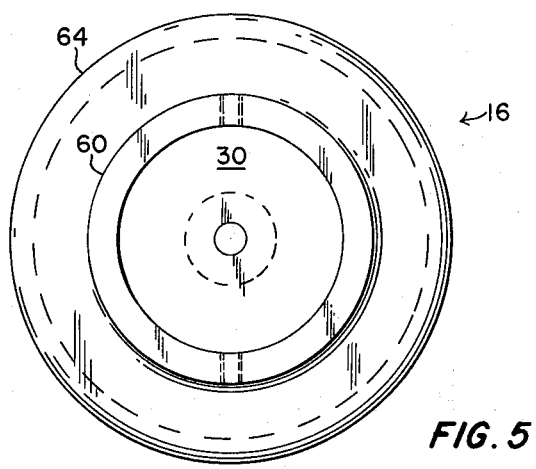
FIG. 5 is a top view of the impeller housing as shown in FIG. 4.
Figure 6:
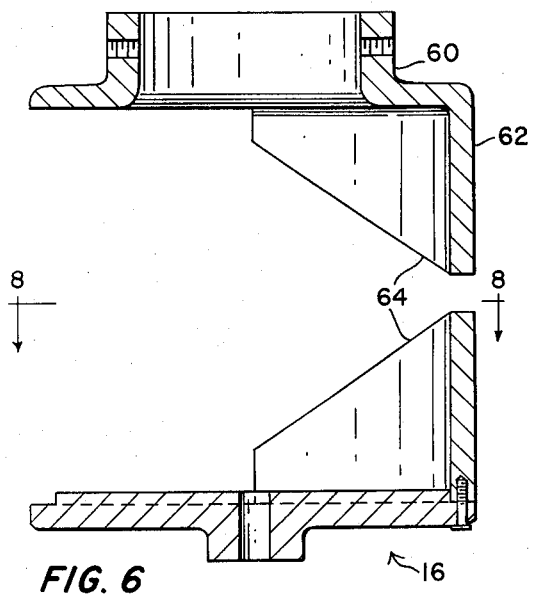
FIG. 6 is a sectional view taken along lines 6—6 of FIG. 4.
Figure 4:
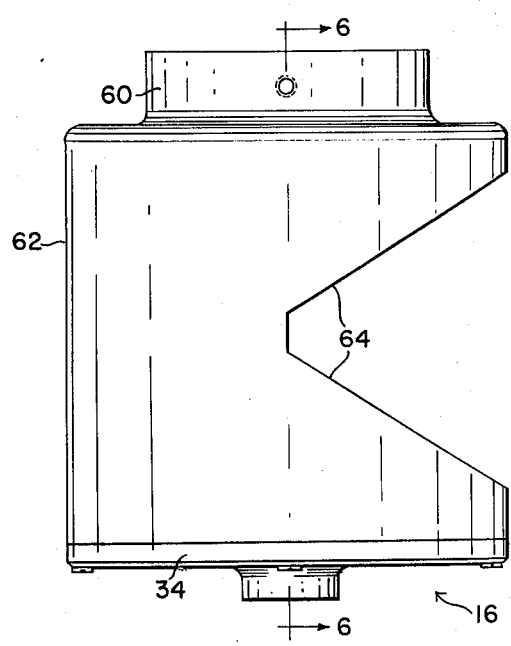
FIG. 4 is a side view of the impeller housing.
Figure 7:
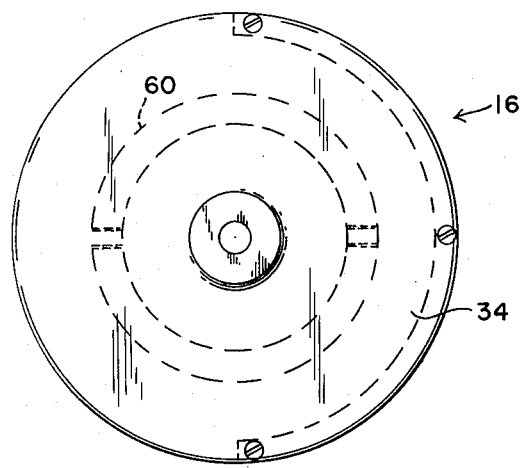
FIG. 7 is a bottom plan view of the impeller housing of FIG. 4.
Figure 12:
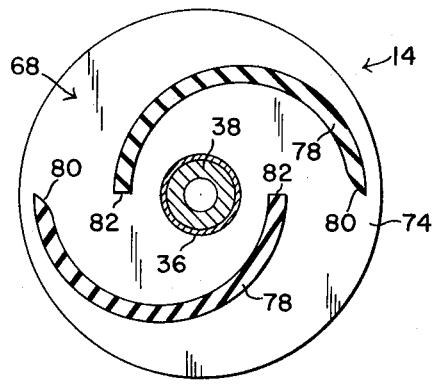
FIGS. 12 and 13 are sectional views taken along lines 12—12 and 13—13 of FIG. 11, respectively.

The major components of impeller housing 16 are best illustrated by FIGS. 4 through 8 inclusive, with secondary reference to FIGS. 2 and 3 for association with other parts of the flowmeter. In addition to base plate 34, housing 16 includes a semi-cylindrical shroud 62 which is centrally V-notched about substantially 90° of its semi-circular circumference at 64, on the planned upstream side of the flowmeter. As shown in FIG. 2 notch 64 is vertically symmetrical with respect to the rotor stack of the impeller. FIGS. 2 and 4 illustrate the upstream side of the impeller, the side first in the path of the fluid in the pipeline. Shroud 62 thus substantially controls flow against one side of the impeller 14.

Shroud 62 is supported solely by member 52 and is rotatably angularly adjustable about the vertical axis of shaft 30 by means of a plurality of round head set screws 66 threaded through upper reduced neck portion 60 of shroud 62, the adjustment serving to increase or decrease flow impingement against impeller 14 to properly calibrate the register of the flowmeter with respect to a known flow. Normally such calibration will be done at the factory so that all the ultimate consumer has to do is insert the assembled flowmeter into pipeline 10 in the field without need of further calibration. Of significance is the fact that notch 64, alone and in cooperation with the construction of impeller 14 which is discussed hereinbelow, imparts relative insensitivity to slight angular variations in the location of the flowmeter about a vertical axis upon installation into pipeline 10 so that the meter readings are within desired accuracy limits even though installation of flowmeter 18 may be slightly imperfect. With reference to FIG. 2, it will be noted that notch 64 yields a relatively small opening for flow to impinge the blades of impeller 14, the greater degree of impingement being to the outside of the notch. On the other hand, prior art shrouds have been designed with substantially one complete half of the impeller exposed to pipeline flow, thus making calibration of the flowmeter register difficult and yielding inaccurate readings without perfect pre-planned installation of the flowmeter in the pipeline.

Of further significance is the point of calibration for the flowmeter, this being entirely beneath pressure plate seal 52 by means of set screws 66 so that recalibration of the instrument, if necessary, may occur without violating the initial water tight seal provided between register housing 54 and plate 52. Prior art flowmeters known to applicants all require some interference between the register and impeller sections for calibration or recalibration of the instrument, thereby providing opportunity for leakage in the flowmeter at a rather critical interface of components.

Figure 13:
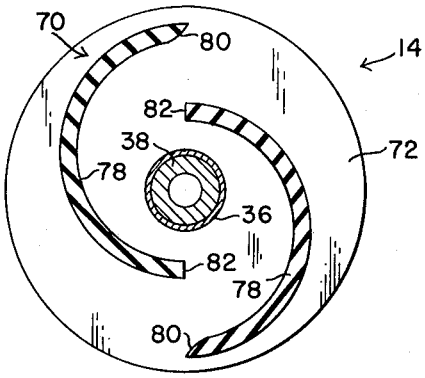
Figure 9:
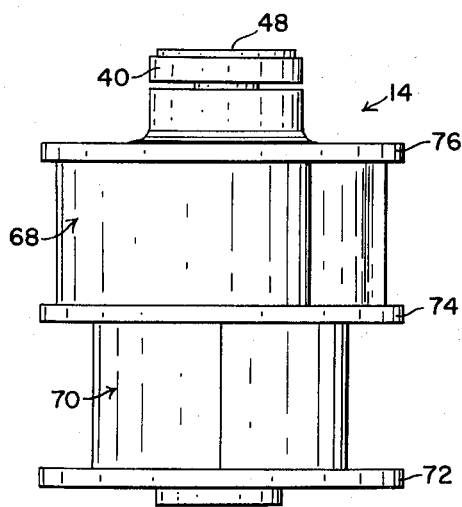
FIG. 9 is a side elevational view of the flowmeter impeller.
Figure 11:
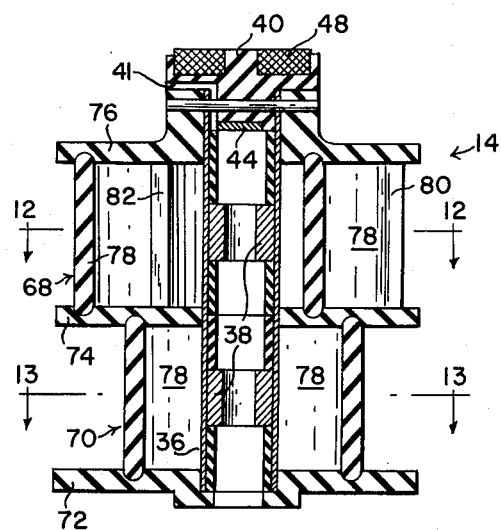
FIG. 11 is a sectional view taken along lines 11—11 of FIG. 10.
Figure 10:
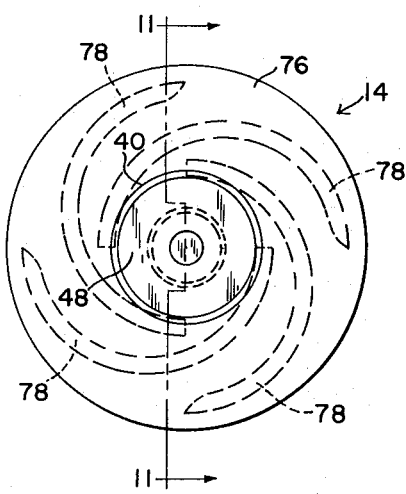
FIG. 10 is a top plan view of the impeller as shown in FIG. 9.

The elements of impeller 14 are best illustrated by FIGS. 9 through 12 inclusive, again with secondary reference to FIGS. 2 and 3 for orientation of the impeller 14 with respect to other components of the flowmeter. Impeller 14 comprises a stacked arrangement of a pair of rotors 68,70, interconnected by bottom, intermediate and top circular plates 72,74 and 76 respectively. Each rotor 68,70 has a pair of arcuate, substantially semi-circular blades 78,78, streamlined at thier outer flow impingement edges 80,80 and having inner terminal edges 82,82 spaced from the cylindrical retainer 36 located at the center of impeller 14. The reason for such construction is clear from FIGS. 12 and 13; as fluid flows past a terminal edge 82 it will strike the other associated blade 78 to further assure rotation of impeller 14. These Figures also illustrate that one rotor 68 is offset 90° on a vertical axis with respect to the other rotor 70. The associated arrangement is shown in FIG. 10 wherein an assembly of four equispaced blades is provided to assure rotation of impeller 14 even under minimal flow conditions but without creation of interfering vortices during flow in that the rotor blades are located at different vertical levels to minimize disturbance to the flow stream as it passes the impeller.

As set forth above with respect to the construction of shroud 62 of impeller housing 16, the indicated construction of impeller 14 is relatively insensitive to angular displacement thereof because the impeller will rotate even under minimal flow conditions. Furthermore, unlike prior art flowmeters, location of the impeller within pipeline at the axial center thereof to assure accurate registry of flow is not necessary. Impeller assemblies in the prior art caused such great disturbance to flow passing thereby that unless located centrally of the flow stream, flow interference between the sidewalls of the pipeline and the impeller itself would distort registry of flow. In contradistinction, the impeller and housing therefor in this case cause only minimal flow disturbance so that location of the impeller outside of the precise axial center of the flowstream will not distort the desired accurate registry of flow by the flowmeter.

Figure 14:
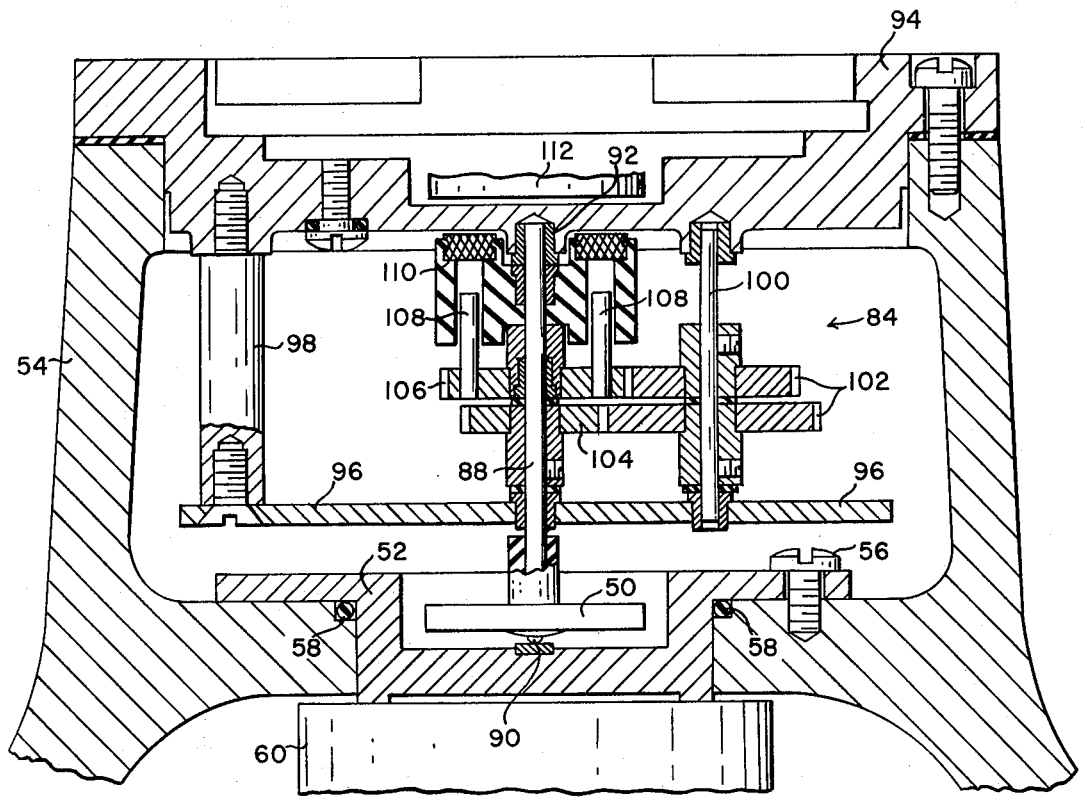
FIG. 14 is an enlarged sectional view of the magnetic coupling means of the flowmeter.

Turning now to FIG. 14, the internal parts of the magnetic coupling mechanism and associated gearing 84 for the register will be described. Secondary magnet 50 is mounted at the base of a vertical drive shaft 88 weich is rotatably supported at the bottom by a jewel bearing 90 and at the top by means of a sleeve bearing 92 located centrally in mounting head 94, which contains the readable flowmeter register (not shown). A gearing support plate 96 is suspended from circumferentially spaced stanchions 98 and supports an idler shaft 100 having a pair of reduction spur gears 102 fixed thereon. Drive input gear 104 is fixed to drive shaft 88 while output gear 106 is freely rotatable about shaft 88. Gear 106 includes a pair of pins 108 supporting the primary magnet 110 of a second magnet coupling for magnet 112 of the flowmeter register.

The materials of which the flowmeter is constructed may be selected from a variety of metals and plastics, except that those components adjacent magnetic couplings should be of a non-ferro magnetic nature. In the drawings, impeller 14 is illustrated as plastic while impeller housing 16 is shown as metal. Both parts or one or the other may be metal or plastic.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalencey of the claims are therefore intended to be embraced therein.

What is claimed and desired to be secured by Letters Patent is:

1. A flowmeter for a pipeline comprising a register adapted to be mounted over a lateral opening in the pipeline and an impeller assembly suspended from said register adapted to be inserted into the path of fluid flow in the pipe-line, means for mounting said register upon said pipeline having fixed thereon an impeller assembly mounting member provided with a depending annular portion projecting into said opening, said impeller assembly comprising an impeller assembly rotatable about an axis transverse to pipeline fluid flow and a support housing for the impeller having an upstream directed lateral opening for admitting fluid to rotate the impeller assembly, and means mounting said housing on said depending annular portion of said impeller assembly mounting member for rotatable adjustment about said transverse axis to vary the disposition of said opening with respect to the fluid flow path and thus vary the effective fluid flow admission area of said opening relative to said impeller assembly to calibrate said flowmeter.

2. The flowmeter as recited in claim 1 wherein said impeller comprises a plural stack of individual rotor assemblies, separated by at least one central interconnecting plate.

3. The flowmeter as recited in claim 2 wherein said plural stack of individual rotor assemblies is at least two in number, each rotor assembly comprising a pair of semi-circular curved blades having outer vertical edges arranged to first contact pipeline fluid flow and inner terminal edges spaced from the center of said rotor to direct fluid flow against the other of said blades.

4. The flowmeter as recited in claim 3 wherein said blade outer vertical edges are streamlined shaped whereby minimal disturbance to said pipeline fluid flow is generated.

5. The flowmeter recited in claim 1, in combination with a tubular section of pipeline having a lateral opening and there being means for securing said register to said pipeline section with said depending annular portion of the impeller assembly mounting member extending through said opening, said housing having an upper end wall located adjacent said opening and said impeller assembly being mainly disposed in said pipeline section radially between said opening and the axial center of fluid flow through said pipeline section.

6. A flowmeter for a pipeline comprising a register mounted over a lateral opening in the pipeline and an impeller assembly suspended from said register, inserted into the path of fluid flow in the pipeline, said impeller assembly comprising an impeller rotatable about an axis transverse to pipeline fluid flow, a support housing for the impeller having an upstream directed lateral opening for admitting fluid to rotate the impeller, and means for adjusting the housing about said transverse axis to vary the disposition of said opening with respect to the fluid flow path and thus the effective fluid flow admission area of said opening relative to said impeller to calibrate said flowmeter, said housing lateral opening being of changing size along a plane drawn transversely of the path of fluid flow in the pipeline.

7. The flowmeter as recited in claim 6 wherein said impeller housing includes a central, semi-cylindrical shroud, said housing lateral opening comprising a generally laterally disposed V-shaped notch having its open, wide end disposed at a terminal, vertical edge of said semi-cylindrical shroud, and its inner closed end located substantially centrally of said semi-cylindrical shroud.

8. The flowmeter as recited in claim 7 wherein said semi-cylindrical shroud extends substantially about 180° around said impeller on the upstream side of the pipeline.

9. A flowmeter for a pipeline comprising a register adapted to be mounted over a lateral opening in the pipeline and an impeller assembly suspended from said register adapted to be inserted into the path of fluid flow in the pipeline, said impeller assembly comprising an impeller consisting essentially of a plural stack of rotor assemblies at different vertical levels rotatable about an axis transverse to pipeline fluid flow and a support housing for the impeller having an upstream directed lateral opening laterally changing size and vertically symmetrical with the rotor assembly stack for admitting fluid to rotate the impeller, and means for adjusting said housing about said transverse axis to vary the disposition of said opening with respect to the path of fluid flow and thus vary the effective fluid flow admission area of said opening relative to said impeller to calibrate said flowmeter.

10. The flowmeter as recited in claim 9 wherein said plural stacks of rotor assemblies are at least two in number, each rotor assembly comprising a circular base support plate and a pair of curved semi-circular blades mounted thereon, said rotor assemblies mounted one above the other on rotational support means secured to said impeller housing.

11. A flowmeter assembly adapted for mounting over a lateral pipeline opening comprising clamp means adapted to be secured on said pipeline and having a saddle for extending over said opening, said saddle having an opening adapted to be aligned with the pipeline opening, a seal member fixed on said saddle to extend across the saddle opening and having a depending tubular portion projecting through the saddle opening, and an impeller assembly suspended from said seal member comprising an impeller housing having a side opening for admitting fluid to rotate an impeller therein and having an upper tubular portion telescoped with and rotatably adjustably secured upon said depending tubular portion of the seal member.

12. The flowmeter defined in claim 11 wherein a register housing is provided as an integral upstanding formation of said saddle around said saddle opening.

13. The flowmeter defined in claim 12, wherein said seal member is formed with lower and upper recesses and magnetic drive members connected respectively to the impeller and register are received in said recesses.

14. A flowmeter for a pipeline comprising a register adapted to be mounted over a lateral opening in the pipeline and an impeller assembly suspended from said register adapted to be inserted into the path of fluid flow in the pipeline, means for mounting said register upon said pipeline having fixed thereon an impeller assembly mounting member provided with a depending portion projecting into said opening, said impeller assembly comprising an impeller rotatable about an axis transverse to pipeline fluid flow and a support housing for the impeller having an upstream directed lateral opening for admitting fluid to rotate the impeller, means mounting said housing on said depending portion of said impeller assembly mounting member for adjustment about said transverse axis to vary the disposition of said opening with respect to the fluid flow path and thus vary the effective fluid flow admission area of said opening relative to said impeller to calibrate said flowmeter, said depending portion of said impeller assembly mounting member and said impeller housing being formed with relatively rotatably adjustable telescoping annular sections coaxial with said axis, and releasable means for securing said sections in adjusted positions.

15. The flowmeter defined in claim 14, wherein said annular section of said impeller assembly mounting member comprises a boss having an imperforate transverse wall separating the interior of the boss into a downwardly open space for receiving a magnetic drive member on the impeller and an upwardly open space for receiving a magnetic driven member of the register.

* * * * *